United States Patent [19]

Suzuki et al.

[11] Patent Number: 4,691,756

[45] Date of Patent: Sep. 8, 1987

[54] MOLDING MATERIAL AND MOLD

[75] Inventors: Takatoshi Suzuki; Yasuo Takada; Yuji Sakakibara; Masahiro Sugiura; Hiroaki Hayashi; Osami Kamigaito, all of Aichi, Japan

[73] Assignee: Kabushiki Kaisha Toyota Chuo Kenkyusho, Aichi, Japan

[21] Appl. No.: 896,199

[22] Filed: Aug. 14, 1986

[30] Foreign Application Priority Data

Aug. 22, 1985 [JP] Japan .............................. 60-184550
Dec. 2, 1985 [JP] Japan .............................. 60-271192

[51] Int. Cl.⁴ ........................... B22C 1/18; B22C 1/22
[52] U.S. Cl. ..................................... 164/361; 164/21; 164/526; 164/529
[58] Field of Search ........................ 164/526–529, 164/21, 138, 361; 523/139, 142–145

[56] References Cited

U.S. PATENT DOCUMENTS 4,048,134 9/1977 Courtenay et al. ............... 523/145
4,216,133 8/1980 Johnson et al.

FOREIGN PATENT DOCUMENTS 56-163055 12/1981 Japan ............................... 164/527

Primary Examiner—Kuang Y. Lin
Attorney, Agent, or Firm—Oblon, Fisher, Spivak, McClelland, & Maier

[57] ABSTRACT

Molding material composed of casting sand coated with a thermosetting resin and hydrous magnesium silicate clay mineral which may be impregnated with an acid and/or coated with a thermosetting resin, and a shell mold produced from the molding material. This material and mold minimize generation of smoke and irritating gases at the time of mold making and casting.

14 Claims, 5 Drawing Figures

MOLDING MATERIAL AND MOLD

BACKGROUND OF THE INVENTION

1. Field of the Invention

The present invention relates to a molding material for shell molds and cores and a shell mold made therefrom, and, more particularly, it relates to a molding material which gives off only a small amount of smoke and/or irritating gases (including offensive odors and poisonous gases resulting from the decomposition of resin) and to a mold made therefrom.

2. Description of the Prior Art

Shell molding process has been in general use for the production of molds and cores for casting (collectively called molds hereinafter). According to the shell molding process, sand molds are produced by using as the binder a phenolic resin or other synthetic resin which cures upon heating. Molds produced by this shell molding process provide castings with superior finish and high dimensional accuracy. The molding material used for the shell molding process is resin-coated casting sand, e.g. fine silica sand coated with a thermosetting resin such as phenolic resin.

The resin-coated casting sand, however, has a disadvantage. That is, it gives off irritating gases of formaldehyde, phenol, ammonia, etc. in the coating process and when it is made into molds with heating. Molds of resin-coated sand also give off irritating gases at the time of casting. These irritating gases aggravate the working environment of a foundry and make it necessary to install a costly air cleaner. Further, even such costly air cleaner still does not serve the purpose well.

In order to eliminate this disadvantage, there was proposed a molding material consisting of sand and unsaturated polyester resin as a coating resin. (Japanese Laid-open Pat. Publication Nos. 80234/1976 and 59560/1981.) This molding material gives off a less amount of irritating gases than those using phenolic resin-coated sand. However, it is poor in moldability.

On the other hand, there is a problem where the conventional resin-coated sand is used. That is, molds made from it do not readily disintegrate after casting, especially where the casting temperature is low, as in the casting of aluminum and magnesium. Incomplete mold disintegration leads to additional labor for sand strip and core removal.

In the case of ferrous metal casting, the shell molds easily disintegrate, permitting cores to be removed easily from the casting. This is because the poured molten metal heats the molds up to 800 to 1000° C. at which phenolic resin (or other thermosetting resin) as the binder is pyrolyzed almost completely, and the molds thus naturally lose their strength after casting. However, mold disintegration does not take place readily in the case of aluminum or other low-melting metals. This is because the mold temperature after pouring is 300 to 400° C., at which the binder does not decompose completely, and the molds still retain most of their strength even after casting. This situation make it very difficult to remove cores from casting of complex shape. To facilitate the removal of cores, it is necessary to heat the mold at about 500° C. for a long time in a furnace. This step requires a large amount of energy and lowers productivity.

In order to solve the above-mentioned problems, the present inventors carried out a series of researches, which led to the present invention.

SUMMARY OF THE INVENTION

Accordingly, it is an object of the present invention to provide a molding material for shell molds which minimizes generation of smoke and/or irritating gases at the time of mold making.

It is another object of the invention to provide a shell mold produced from said molding material which minimizes generation of smoke and/or irritating gases at the time of casting.

It is further object of the invention to provide a molding material for shell molds which can be easily made into shell molds, and a shell mold produced from said molding material which readily disintegrates after casting even though the molten metal is at a low temperature as is the case with aluminum or magnesium.

The molding material of this invention is composed of casting sand coated with a thermosetting resin and hydrous magnesium silicate clay mineral. (Referred to as the first aspect hereinafter.)

The molding material in the first aspect of this invention is further characterized by that the hydrous magnesium silicate clay mineral contains an acid. (Referred to as the second aspect hereinafter.)

The molding material in the first aspect of this invention is further characterized by that the hydrous magnesium silicate clay mineral is coated with a thermosetting resin. (Referred to as the third aspect hereinafter.)

The molding material in the second aspect of this invention is further characterized by that the hydrous magnesium silicate clay mineral is coated with a thermosetting resin. (Referred to as the fourth aspect hereinafter.)

The shell mold of this invention has a cavity defined by a wall or walls into which molten metal is poured to produce a casting and at least a part of said wall(s) is formed of casting sand coated with a thermosetting resin and hydrous magnesium silicate clay mineral, voids being formed among the grains of said resin-coated casting sand and said clay mineral, and said resin-coated casting sand and said clay mineral being bonded together. (Referred to as the fifth aspect hereinafter.)

The shell mold in the fifth aspect of this invention is further characterized by that the hydrous magnesium silicate clay mineral contains an acid. (Referred to as the sixth aspect hereinafter.)

The shell mold in the fifth aspect of this invention is further characterized by that the hydrous magnesium silicate clay mineral is coated with a thermosetting resin. (Referred to as the seventh aspect hereinafter.)

The shell mold in the sixth aspect of this invention is further characterized by that the hydrous magnesium silicate clay mineral is coated with a thermosetting resin. (Referred to as the eighth aspect hereinafter.)

The molding material of this invention prevents or minimizes generation of smoke and irritating gases at the time of mold making. In addition, it can be made into shell molds easily.

The shell mold of this invention also prevents or minimizes generation of smoke and irritating gases at the time of casting. In addition the shell mold of this invention readily disintegrates after casting even though the casting temperature is comparatively low as is the case with aluminum or magnesium. Therefore, it obviates the necessity of post heating.

DETAILED DESCRIPTION OF THE INVENTION

Figure 1:
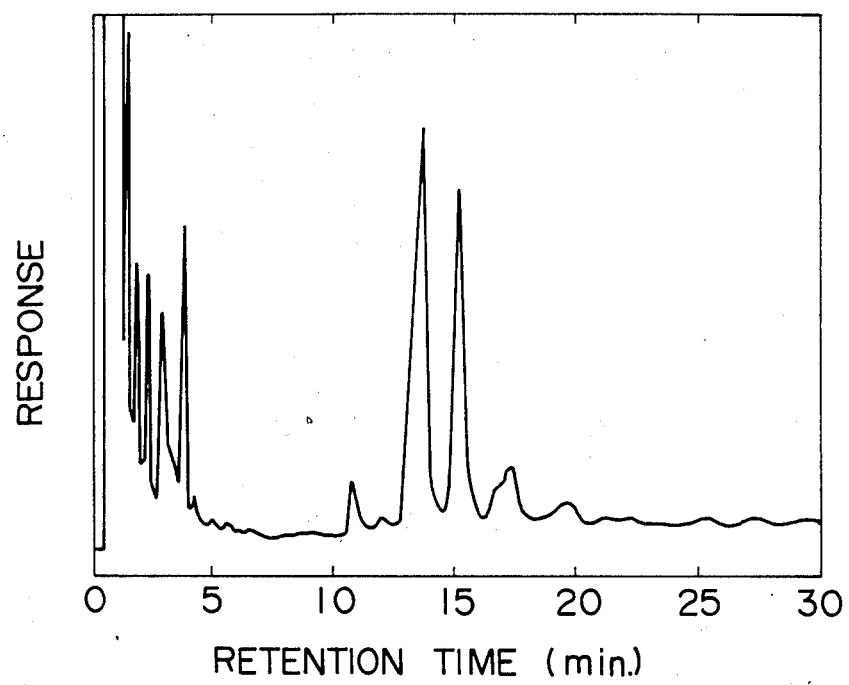
FIG. 1 is a graph showing the results of quantitative analysis of aldehyde in the second and sixth aspects.

In the molding material of this invention, casting sand as a base material is coated with a thermosetting resin as a binder.

The casting sand is the base material which constitutes the shell mold. It is refractory sand such as silica sand, zircon sand, chromite sand, olivine sand, sea sand, river sand, and crushed sand. They may be used individually or in combination with one another. Casting sand of desired type and desired grain shape and size is selected in consideration of flow characteristics, filling performance, toughness, thermal expansion, rate of solidification, etc. The grain shape of casting sand should preferably be spherical. Casting sand of spherical grains readily flows and produces a high mold strength with a comparatively small amount of resin. In addition, it provides molds having a high permeability.

The thermosetting resin binds together the grains of casting sand and hydrous magnesium silicate clay mineral. It functions as a binder to form the sand and clay mineral into a mold. The thermosetting resin includes, for example, novolak-type phenolic resin (such as phenol-formaldehyde resin and phenol-furfural resin), resol-type phenolic resin (such as resorcin-formaldehyde resin and ammonia-resol resin), urea resin, silicone resin, and melamine resin.

The coating of casting sand with the resin may be accomplished in the usual way such as hot coating method, dry hot coating method, semihot coating method, cold coating method, and powder solvent method. The resin may be incorporated with proper additives as the case may be.

The amount of resin should be in the range of 1 to 10 wt %, depending on the amount of hydrous magnesium silicate clay mineral and additives and the manufacturing conditions. The preferred amount is 2 to 6 wt % where the casting sand is silica sand and 2 to 4 wt % where the casting sand is zircon sand.

The resin-coated casting sand should have a particle diameter of 50 $\mu$m to 1 mm.

The hydrous magnesium silicate clay mineral (referred to as clay mineral hereinafter) is composed mainly of hydrous magnesium silicate having reactive hydroxyl groups on the surface thereof. This clay mineral is made up of fine fibers each having a diameter of 0.005 to 0.6 $\mu$m and fine channels in parallel to said fibers, each having a rectangular cross section (about 6 to 10 A). In some cases, the magnesium or silicon in the clay mineral may be partly replaced by aluminum, iron, nickel, or sodium.

Typical examples of the clay mineral include sepiolite, xylotile, loughlinite, and falcondoite (all containing hydrous magnesium silicate as the major constituent), and palygorskite (containing hydrous aluminum silicate as the major constituent). They may be used individually or in combination with one another. They may be calcined at 400 to 800° C. prior to use.

These examples of clay mineral may be called by the common names of mountain cork, mountain wood, mountain leather, meers-chaum, and attapulgite.

The clay mineral may be used in the form of powder, granule, or plate crushed to such an extent that the clay mineral retains the microvoids therein. The size of clay mineral particles should be 50 $\mu$m to 1 mm, preferably 100 $\mu$m to 500 $\mu$m. Crushing may be carried out by wet process or dry process using a jaw crusher, hammer mill, roller mill, crushing granulator, vibration mill, pin mill, beater, or the like.

The molding material for shell molds as set forth in the first aspect of the invention is composed of casting sand coated with the above-mentioned thermosetting resin and hydrous magnesium silicate clay mineral.

The molding material for shell molds as set forth in the second aspect of the invention is characterized by that the hydrous magnesium silicate clay mineral in the first aspect contains an acid. In other words, it is composed of casting sand coated with the above-mentioned thermosetting resin and hydrous magnesium silicate clay mineral containing an acid.

This acid-containing hydrous magnesium silicate clay mineral is produced by impregnating with an acid the clay mineral used in the first aspect.

The acid contained in the clay mineral is intended to neutralize the alkaline gases which are liberated when the molding material is produced or when the shell molds are used for casting, thereby alleviating the injury of alkaline gases and preventing the gases from being combined with other components and forming other toxic or irritating gases. In addition, the acid serves to keep the necessary strength of the binder resin used in the shell mold. Typical examples of the acid include organic acids such as formic acid (HCOOH), acetic acid (CH$_3$COOH), and phthalic acid (HOOCC$_6$H$_4$COOH), and inorganic acids such as phosphoric acid (H$_3$PO$_4$), boric acid (H$_3$BO$_3$), nitric acid (HNO$_3$), and sulfuric acid (H$_2$SO$_4$). They may be used individually or in combination with one another.

The acid impregnation may be accomplished by slowly adding with stirring an aqueous solution of the acid to the clay mineral, by spraying an aqueous solution of the acid onto the clay mineral with stirring, or by dipping the clay mineral in an aqueous solution of the acid.

The content of the acid in the clay mineral should preferably be $10^{-3}$ to 50 wt %. With a content less than $10^{-3}$ wt %, the acid does not produce its effect. The acid in excess of 50 wt % causes some troubles. For example, in the case where the acid-impregnated clay mineral is coated with a resin, and then mixed with resin-coated casting sand, the casting sand is easily formed into masses. The resulting material does not smoothly flow and does not tightly compact. Moreover, the excess acid leaches aluminum ions or magnesium ions from the clay mineral, changing the structure of the clay mineral and reducing the effect of preventing or minimizing smoke and irritating gases. The more preferred acid content is $10^{-2}$ to 30 wt % for the effective reduction of smoke and irritating gases.

The molding material as set forth in the third aspect of the invention is characterized by that the hydrous magnesium silicate clay mineral in the first aspect is coated, at least partly, with a thermosetting resin.

The thermosetting resin may be the same one as used for the coating of casting sand mentioned above. A different kind of thermosetting resin may also be used where additional strength is required. The amount of the coating resin should preferably be 0.5 to 20 wt %. With an amount less than 0.5 wt %, the thermosetting resin does not produce the effect of coating. The thermosetting resin in excess of 20 wt % weakens the effect of suppressing smoke and irritating gases at the time of mold making and casting. More preferably, the coating amount should be equal to the amount of thermosetting resin coated on the casting sand. In this case, satisfactory bonding is achieved between the casting sand and the clay mineral.

The molding material for shell molds as set forth in the fourth aspect of this invention is characterized by that the acid-containing hydrous magnesium silicate clay mineral in the second aspect is coated, at least partly, with a thermosetting resin.

The thermosetting resin used for the coating of the clay mineral in the fourth aspect is the same one as used for the coating of clay mineral in the third aspect.

The clay mineral or the resin-coated clay mineral should preferably be mixed at a ratio of 0.5 to 45 parts by weight per 100 parts by weight of the casting sand coated with a thermosetting resin (resin-coated casting sand). If the amount of the clay mineral is less than 0.5 part by weight, it does not produce the effect of reducing the smoke and irritating gases which are liberated at the time of mold making or at the time of casting. Resin-coated clay mineral in excess of 45 parts by weight prevents the formation of shell molds. The more preferred amount of the clay mineral is 1 to 10 parts by weight.

The molding material for shell molds as set forth in the first aspect may be incorporated with other additives so long as they do not impair the performance of the molding material. Typical examples of such additives are metal oxides (such as zinc oxide, iron oxide, manganese oxide, and titanium oxide) and hexamethylenetetramine which accelerate the curing of the resin in the mold making process or accelerate the thermal decomposition of the resin in the castin process. Other examples include a halogen-based substance added to the resin to improve the ability of the mold to disintegrate after casting; a filler such as steel beads, ballast and silica sand to prevent the molds from swelling at the time of casting; a combustible volatile substance such as coal powder, pitch powder, coke powder, graphite powder, and gilsonite to improve the casting surface; and a wetting agent such as kerosene to ensure the uniform coating of the resin on the casting sand. These additives may be added to the resin or added at a proper time in the process of coating the casting sand with a resin or mixing the components of the molding materials.

The molding material for shell molds as set forth in the first aspect is prepared in the following manner.

At first, resin-coated casting sand is prepared in the usual way by coating casting sand with phenol-formaldehyde resin or any other proper resin.

Hydrous magnesium clay mineral is crushed into proper shape and size using a mixer, ball mill, or the like. Before or after crushing, it may be calcined at 400 to 800° C.

The thus prepared resin-coated casting sand and clay mineral are mixed using a mortar mixer or the like so that the clay mineral is uniformly dispersed. Additives may also be added according to need.

Figure 4:
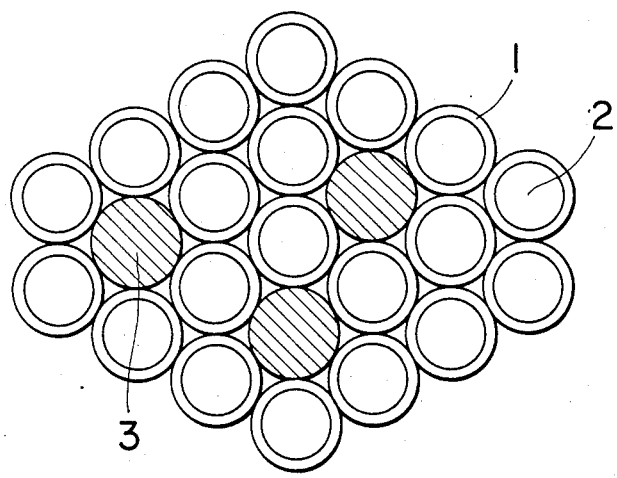
FIG. 4 is a conceptual representation of the structure of the molding material pertaining to the first aspect of this invention.

The molding material thus obtained is composed of casting sand (2) coated with resin (1) and hydrous magnesium clay mineral (3) as schematically shown in FIG. 4.

The molding material for shell molds as set forth in the third aspect is prepared in the following manner.

At first, resin-coated casting sand is prepared in the usual way by coating casting sand with phenol-formaldehyde resin or any other proper resin.

Hydrous magnesium clay mineral is crushed into proper shape and size using a jaw crushed, hammer mill, or the like. Before or after crushing, it may be calcined at 400 to 800° C.

The thus prepared resin-coated casting sand and clay mineral are mixed using a mortar mixer or the like so that the clay mineral is uniformly dispersed. The resulting mixture is mixed with phenol-formaldehyde resin or any other proper resin, with or without additives, using a speed muller, speed mixer, or the like so that the clay mineral is uniformly dispersed.

Figure 5:
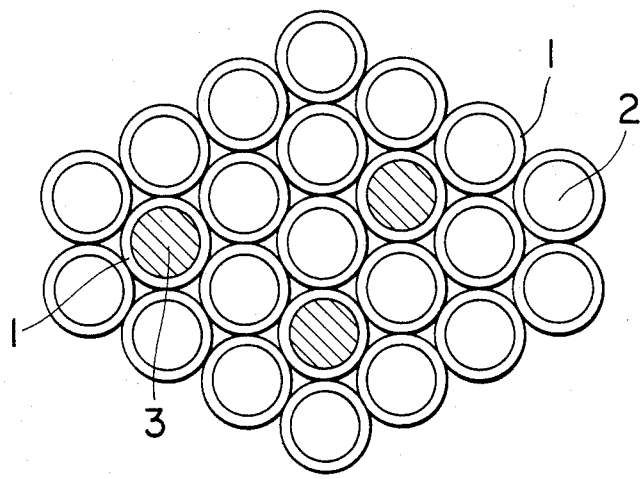
FIG. 5 is a conceptual representation of the structure of the molding material pertaining to the third aspect of this invention.

According to the above-mentioned method, the resin-coated sand and clay mineral are mixed together. According to an alternative method, casting sand and clay mineral are mixed together and a resin is added to the resulting mixture. According to further another method, resin-coated casting sand, resin coated clay mineral, resin, and additives are mixed together all at once. The molding material thus obtained is composed of casting sand (2) coated with resin (1) and hydrous magnesium clay mineral (3) coated with resin (1) as schematically shown in FIG. 5.

The shell mold as set forth in the fifth aspect of the invention will be described in detail in the following.

The shell mold is produced from the molding material as set forth in the first aspect of the invention.

The shell mold of this invention comprises a cavity defined by a wall or walls into which molten metal is poured for casting, wherein at least a part of the wall of walls is formed of casting sand coated with a thermosetting resin, and hydrous magnesium silicate clay mineral, and voids are formed among grains of said resin-coated casting sand and said clay mineral, with said resin-coated casting sand and said clay mineral being bonded together.

The cavity is a hollow space into which the molten metal is poured, and it is formed by a wall or walls.

The wall or walls constitute the mold proper and they are composed of resin-coated casting sand and hydrous magnesium silicate clay mineral, and voids are formed among their grains. In the case of the mold as set forth in the fifth aspect of the invention, the mold and core may be made entirely or partly of the molding material as set forth in the first aspect of the invention, and portions made of such material give the effects of this aspect.

The resin-coated casting sand and hydrous magnesium clay mineral are the same one as described in the first aspect of the invention. They are bonded together upon heating, but their individual grains do not change in structure and form voids among the grains The mold as set forth in the fifth aspect is produced in the following manner.

At first, a die of desired shape made of aluminium, cast iron or ferroalloy is heated at 200 to 300° C. in a furnace with electric or gas heating. The die is sprayed with a silicone liquid or the like to facilitate mold release.

The heated die is completely filled with the molding material as set forth in the first aspect of the invention and held in a furnace (such as siliconit furnace) at 300 to 450° C. for several minutes to several tens of minutes. The shell mold formed in the die is removed form the die.

The shell mold as set forth in the sixth aspect of the invention will be described.

The shell mold is produced from the molding material as set forth in the second aspect of the invention. The shell mold in the sixth aspect is characterized by that the clay mineral as used for the shell mold of the fifth aspect contains an acid.

The resin-coated casting sand and acid-containig hydrous magnesium clay mineral are the same one as described in the second aspect of the invention. They are bonded together upon heating, but their individual grains do not change in structure and form voids among the grains.

The mold as set forth in the sixth aspect is produced in the usual way as in the fifth aspect.

The shell mold as set forth in the seventh aspect of the invention is produced from the molding material as set forth in the third aspect of the invention. The shell mold in the seventh aspect is characterized by that the clay mineral as used for the shell mold of the fifth aspect is coated with a thermosetting resin.

The resin-coated casting sand and resin coated-hydrous magnesium clay mineral are the same one as described in the third aspect of the invention. They are bonded together upon heating, but their individual grains do not change in structure and form voids among the grains.

The mold as set forth in the seventh aspect is produced in the usual way as in the fifth aspect.

The shell mold as set forth in the eighth aspect of the invention is produced from the molding material as set forth in the fourth aspect of the invention. The shell mold in the eighth aspect is characterized by that the acid-containing clay mineral as used for the shell mold of the sixth aspect is coated further with a thermosetting resin.

The mold as set forth in the eighth aspect is produced in the usual way as in the seventh aspect.

The molding material of this invention and the shell mold made therefrom produce a marked effect as mentioned above. The mechanism to produce the marked effect is inferred as follows although it is not yet fully elucidated.

The molding material for shell molds of this invention is composed of casting sand coated with a thermosetting resin and clay mineral (or resin-coated clay mineral). The clay mineral is composed of fine fibers each having pores with a rectangular cross section. This pore has OH groups on its surface and it is considered that they adsorb or absorb smoke and irritating gases. When the molding material is made into molds and when the molds are used for casting, the porous structure of the clay mineral are not broken but preserved. Thus, substances causing smoke and irritating gases are effectively adsorbed or absorbed, thus preventing or reducing generation of such gases. In addition, it is considered that the clay mineral in the mold works as a catalyst to decompose irritating gases and accelerate the thermal decomposition of the resin. As a result, the strength of the mold is decreased to cause the mold to be easily disintegrated.

In the case where the clay mineral contains an acid. the acid neutralizes the alkaline gases which are liberated at the time of mold making and casting. This contributes to the deodorizing effect.

DESCRIPTION OF THE PREFERRED EMBODIMENTS

The invention will be illustrated by the following examples.

EXAMPLE 1

A molding material was prepared from resin-coated casting sand and sepiolite, and the molding material was made into shell molds. The performance of the molds was evaluated by actual pouring.

At first, sepiolite from Turkey was roughly crushed using a jaw crusher and then pulverized using a crushing granulator. There was obtained a sepiolite powder having an average particle diameter of 300 $\mu$m.

Commercial resin-coated casting sand (silica sand: 100 parts by weight, phenolic resin: 2.9 parts by weight, and particle size: No. 6, made by Hisagoya) and the sepiolite powder (containing 6 wt % of water) in an amount as shown in Table 1 were mixed in a mortar mixer for 5 to 10 minutes Thus there was obtained the molding material for shell molds pertaining to the first aspect of the invention.

The molding material was placed in a metal die which was then heated at 400° C. in a siliconit furnace for 2 minutes. Upon removal from the die, there was obtained a shell mold pertaining to the fifth aspect of the invention. This die is composed of an inner die and an outer die. The inner die is a truncated cone (52 mm in upper diameter and 60 mm in lower diameter) attached to a disk (110 mm in diameter and 20 mm in thickness). The outer die is a hollow cylinder (90 mm in outside diameter and 137 mm in height, 71 mm in upper inside diameter and 79 mm in lower inside diameter)

The molding material was good in moldability. It gave off no smoke when heated for mold making. Also, it gave off a very small amount of carbon monoxide (CO) which was below the detecting limit of the gas detector. It gave off only a small amount of irritating and offensive odors.

The resulting shell mold was examined for its performance by actual pouring. Molten aluminum alloy (JIS AC2B, which is similar to AA319) at 750° C. was poured into the mold. The amount of smoke liberated form the mold after pouring was visually observed and the degree of odor was measured organoleptically. The results are shown in Table 1. In the Table, The symbol "—" means "no smoke", the symbol "Δ" means "some smoke", and the symbol "×" means "much smoke". (The same shall apply hereinafter.)

It is noted from Table 1 that the mold gave off very little smoke after pouring. Especially in the case where the amount of sepiolite is 2.0 to 15.0 wt %, slight smoking took place for 30 seconds immediately after pouring but there was no smoking at all thereafter. In addition, the mold gave off only a small amount of irritating odor. After removal of the casting, the mold was easily disintegrated.

For comparison, a mold was produced from the above-mentioned resin coated casting sand alone. (Sample No. C1) The mold was evaluated in the same manner as mentioned above. The results are shown in Table 1. It is noted from Table 1 that the mold for comparison gave off a large amount of smoke and irritating odor after pouring. In addition, in the mold making process, smoke, carbon monoxide, and irritating and offensive odors were liberated. The mold was not readily disintegrated after casting.

The above-mentioned results indicate that the molding material and the shell mold produced therefrom in this example give off only a small amount of smoke and irritating gases at the time of mold making and pouring. The shell mold readily disintegrates after casting.

making. Also, it gave off a very small amount of carbon monoxide (CO) which was below the detecting limit of the gas detector. It gave off a less amount of irritating and offensive odors than that in the first aspect.

The resulting shell mold was examined for its performance by actual pouring. The amount of smoke liberated from the mold after pouring was visually observed and the degree of odor was measured organoleptically. The concentration of carbon monoxide (CO) and ammonia ($NH^3$) in the liberated gas was measured and the amount of aldehyde (—CHO) in the liberated gas was quantitatively determined.

At first, molten aluminum alloy (JIS AC2B) at 750° C. was poured into the mold. The amount of smoke liberated from the mold was visually observed and the

TABLE 1

| Sample No. | Amount of sepiolite (wt %) | Smoking after pouring | | | | | Degree of odor |
|---|---|---|---|---|---|---|---|
| | | After 0.5 min | After 1 min | After 1.5 min | After 2 min | After 3 min | |
| 1 | 0.5 | Δ | — | Δ | Δ | Δ | Slightly low |
| 2 | 1.0 | Δ | — | — | Δ | — | Slightly low |
| 3 | 1.5 | Δ | — | — | Δ | — | Low |
| 4 | 2.0 | Δ | — | — | — | — | Low |
| 5 | 5.0 | Δ | — | — | — | — | Low |
| 6 | 10.0 | Δ | — | — | — | — | Low |
| 7 | 15.0 | Δ | — | — | — | — | Low |
| C1* | — | Δ | x | x | x | Δ | Very high |

*Comparative Example

EXAMPLE 2

A molding material was prepared from resin-coated casting sand and acid-containing sepiolite, and the molding material was made into shell molds. The performance of the molds was evaluated by actual pouring.

At first, sepiolite from Turkey was crushed using a jaw crusher to give a sepiolite powder having an average particle diameter of 250 μm. The sepiolite powder was then impregnated with acetic acid ($CH_3COOH$) of different concentration as shown in Table 2. to give acid-containing sepiolite. The acid content is also shown in Table 2.

Commercial resin-coated casting sand (silica sand: 100 parts by weight, phenolic resin: 2.9 parts by weight, and particle size: No. 6, made by Hisagoya) and the acid-containing sepiolite powder in the ratio of 98 wt % to 2 wt % were mixed using a mortar mixer for 5 to 10 minuites. Thus there was obtained the molding material for shell molds pertaining to the second aspect of the invention.

The molding material was placed in a metal die, which was then heated at 400° C. in a siliconit furnace for 2 minutes in the same manner as in Example 1. Upon removal from the pattern, there was obtained a shell mold pertaining to the sixth aspect of the invention. (Sample Nos. 8 to 11) The molding material was good in moldability. It gave off no smoke when heated for mold degree of odor was examined organoleptically. The results are shown in Table 2.

It is noted from Table 2 that in the case of the mold of this invention, slight smoking took place for 30 seconds immediately after pouring but there was no smoking at all thereafter. In addition, the mold gave off only a small amount of irritating odor.

The concentration of carbon monoxide (CO) and ammonia (NH,) liberated after pouring was measured using Kitagawa gas detector (made by Komei Rikagaku Kogyo Co., Ltd.). The results are shown in Table 2. The sample gas for carbon monoxide was detected by sucking the liberated gas for 3 minutes after pouring, and the sample gas for ammonia was detected by sucking the liberated gas for 1 minutes starting 90 seconds after pouring. It is noted from Table 2 that the concentrations of the two gases were low in the case of the mold pertaining to this example.

The amount of aldehyde (—CHO) in the gas liberated from the mold sample No. 8 was quantitatively determined by gas chromatography. (Aldehyde was collected by the reaction with 2.4-dinitrophenylhydrazine in a hydrochloric acid solution.) The results are shown in FIG. 1. and the conditions of analysis are shown in Table 3. FIG. 1 indicates that the mold in this example gives off only a small amount of aldehyde. In addition. the shell mold in this example readily disintegrates after casting.

TABLE 2

| Sample No. | Acetic acid | | Smoking after pouring | | | | | Degree of odor | Conc. of gas (ppm) | |
|---|---|---|---|---|---|---|---|---|---|---|
| | Conc. (N) | Content (wt %) | After 0.5 min | After 1 min | After 1.5 min | After 2 min | After 3 min | | $NH_3$ | CO |
| 8 | 0.1 | 20 | Δ | — | — | — | — | Low | 540 | 150 |
| 9 | 1.0 | 20 | Δ | — | — | — | — | Low | 380 | 210 |
| 10 | 5.0 | 20 | Δ | — | — | — | — | Low | 620 | 100 |
| 11 | 10.0 | 20 | Δ | — | — | — | — | Low | 330 | 150 |
| 4 | — | — | Δ | — | — | — | — | Low | 900 | 270 |

TABLE 2-continued

| Sample No. | Acetic acid Conc. (N) | Content (wt %) | Smoking after pouring After 0.5 min | After 1 min | After 1.5 min | After 2 min | After 3 min | Degree of odor | Conc. of gas (ppm) NH₃ | CO |
|---|---|---|---|---|---|---|---|---|---|---|
| C2* | — | — | Δ | x | x | x | Δ | Very high | 900 up | 270 |

*Comparative Example

Table 3 Conditions for Analysis of Aldehyde

Column: 2% silicon OV17 on chromosorb WAW, DMCS 80-100 mesh, 3 mm in dia. ×3 m, glass
Column temperature: 200°→300° C. (3° C/min)
Injection temperature: 230° C.
Carrier gas: Helium. 60 ml/min
Detector: Hydrogen flame ionization detector (FID)
  Hydrogen pressure: 0.6 kg/cm²,
  Air pressure: 0.2 kg/cm²
Apparatus: GC-7AG gas chromatograph, made by Shimadzu Seisakusho Ltd.

Figure 2:
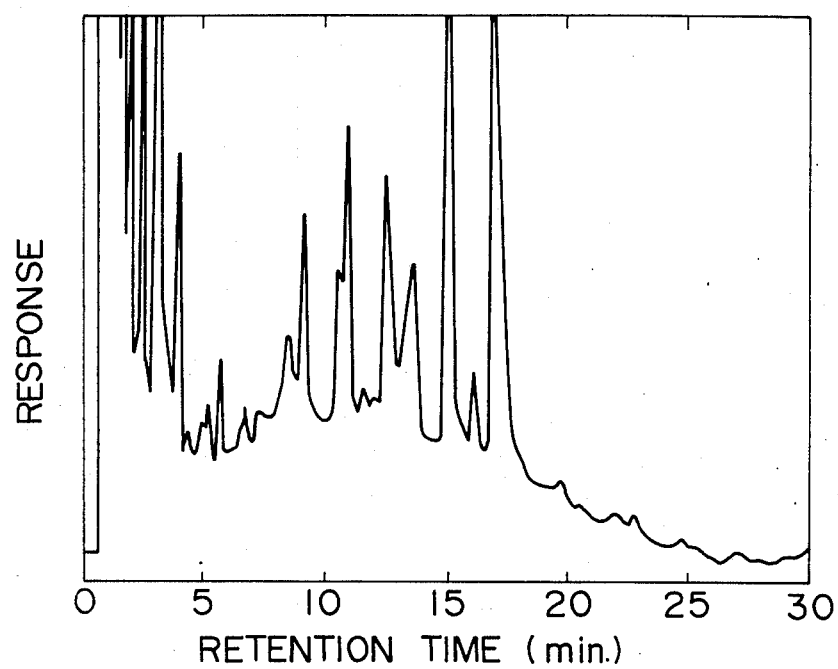
FIG. 2 is a graph showing the results of quantitative analysis of aldehyde in the comparative example in which the conventional resin-coated casting sand was used.

For comparison, a mold was produced from the above-mentioned resin-coated casting sand alone. (Sample No. C2) The mold was evaluated in the same manner as mentioned above. The results are shown in Table 2. (The results of the quantitative determination of aldehyde are shown in FIG. 2.) It is noted from Table 2 that the mold for comparison gave off a large amount of smoke and irritating odor after pouring.

Figure 3:
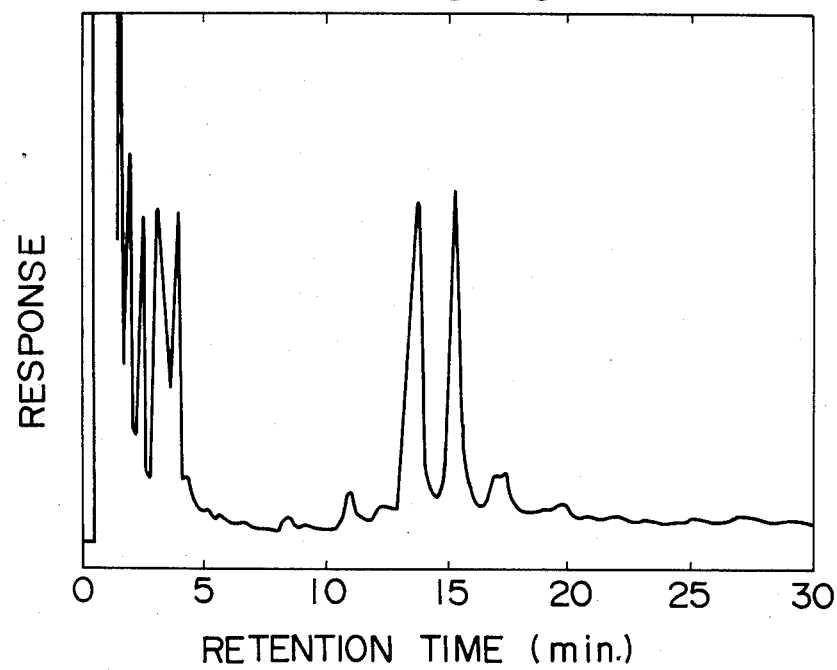
FIG. 3 is a graph showing the results of quantitative analysis of aldehyde in the first and fifth aspects.

For reference. the results obtained with sample No. 4 in Example 1 are also shown in Table 2. The results of the quantitative determination of aldehyde is shown in FIG. 3.

The above-mentioned results indicate that the molding material and the shell mold produced therefrom in this example give off only a small amount of smoke and irritating gases at the time of mold making and pouring. The shell mold readily disintegrates after casting.

EXAMPLE 3

A molding material was prepared from resin-coated casting sand and acid-containing sepiolite, and the molding material was made into shell molds. The performance of the molds was evaluated by actual pouring.

This example was carried out in the same procedure as in Example 2. except that the kind of acid added to sepiolite was varied. The difference between Example 2 and this example is explained below.

The kind and concentration of acid added to sepiolite are shown in Table 4. The content of the acid was 20 wt %.

The molding material pertaining to the second aspect, which is composed of resin-coated casing sand and acid-containing sepiolite, was made into the shell mold pertaining to the sixth aspect. The performance of the shell mold was evaluated in the same manner as in Example 2. (Sample Nos. 12 to 19.) The results are shown in Table 4. The quantitative determination of irritating gases was not carried out. For reference, the results obtained with sample No. C2 for comparison in Example 2 are also shown in Table 4.

The above-mentioned results indicate that the shell mold in this example give off only a small amount of smoke and irritating gases at the time of pouring. The shell mold readily disintegrates after casting.

The molding material in this example was superior in moldability and gave off no smoke and less amount of irritating and offensive odors than that of the first aspect at the time of mold making.

The above-mentioned results indicate that the molding material and the shell mold produced therefrom in this example give off only a small amount of smoke and irritating gases at the time of mold making and pouring. The shell mold readily disintegrates after casting.

TABLE 4

| Sample No. | Acid Kind | Conc. (N) | Smoking after pouring After 0.5 min | After 1 min | After 1.5 min | After 2 min | After 3 min | Degree of odor | Conc. of gas (ppm) NH₃ | CO |
|---|---|---|---|---|---|---|---|---|---|---|
| 12 | HCl | 0.1 | Δ | — | Δ | Δ | Δ | Low | — | — |
| 13 | HCl | 0.5 | Δ | — | Δ | x | x | Low | — | — |
| 14 | H₃PO₄ | 0.1 | Δ | — | — | Δ | — | Low | — | — |
| 15 | H₃PO₄ | 0.5 | Δ | — | — | Δ | — | Low | — | — |
| 16 | H₃PO₄ | 5.0 | Δ | — | — | Δ | — | Low | 200 | 170 |
| 17 | HNO₃ | 5.0 | Δ | — | x | x | — | Low | 500 | 360 |
| 18 | H₃BO₃ | 5.0 | Δ | — | — | Δ | — | Low | — | — |
| 19 | H₃PO₄ | 5.0 | Δ | — | — | — | — | Low | — | — |
| C2* | — | — | Δ | x | x | x | Δ | Very high | 900 up | 270 |

*Comparative Example

EXAMPLE 4

A molding material was prepared from casting sand coated with phenol-formaldehyde resin as the thermosetting resin and palygorskite as the clay mineral, the molding material was made into shell molds. The performance of the molds was evaluated by actual pouring.

At first, 8000 parts by weight of silica sand (No. 6) preheated to 150° C. was mixed with 150 parts by weight of phenol-formaldehyde resin for 30 seconds using a speed mixer. Then, 110 parts by weight of water was added, followed by mixing. Further, 8 parts by weight of calcium stearate was added, followed by mixing. There was obtained resin-coated casting sand having an average particle diameter of 250 μm.

Palygorskite was crushed using a jaw crusher and pulverizer to give a powder having an average particle diameter of 320 μm and containing 5 wt % of water. 1000 parts by weight of the resin-coated casting sand and 25 parts by weight of crushed palygorskite were mixed for 20 minutes using a mortal mixer. Thus there was obtained the molding material pertaining to the first aspect. (Sample No. 20)

The molding material was placed in a metal die, which was then heated at 400° C. in a siliconit furnace for 2 minutes, in the same manner as in Example 1. Upon removal from the die, there was obtained a shell mold pertaining to the fifth aspect of the invention. The molding material was good in moldability. It gave off no smoke when heated for mold making. Also, it gave off a very small amount of injurious gases which were below the detecting limit of the gas detector. It gave off only a small amount of irritating and offensive odors.

The resulting shell mold was examined for its performance by actual pouring. The amount of smoke and irritating gases liberated from the mold after pouring was observed. Slight smoking took place for 30 seconds immediately after pouring but there was no smoking at all thereafter. In addition, the mold gave off only a small amount of irritating and offensive odors. After removal of the casting, the mold was easily disintegrated.

EXAMPLE 5

A molding material was prepared from casting sand, sepiolite, and novolak-type phenolic resin, and the molding material was made into shell molds. The performance of the molds was evaluated by actual pouring.

At first, sepiolite from Turkey was roughly crushed using a jaw crusher and further pulverized using a crushing granulator to give a sepiolite powder having an average particle diameter of 200 μm.

Commercial silica sand (No. 6. made by Mikawa Keiseki Co., Ltd.) and sepiolite powder (containing 2 wt % of water) in an amount shown in Table 5 were mixed using a mortar mixer for 5 to 10 minutes, 100 parts by weight of the resulting mixture was heated to 150° C. and 3 parts by weight of novolak-type phenolic resin (made by Asahi Yukizai Kogyo Co., Ltd.) was added to the heated mixture, followed by mixing for 50 seconds. Further, 0.45 parts by weight of hexamethylenetetramine and 1.5 parts of cooling water were added, followed by mixing for 30 seconds. Finally, 0.1 parts by weight of calcium stearate was added with mixing. Thus there was obtained the molding material for shell molds pertaining to the third aspect of the invention.

The molding material was placed in a metal die, which was then heated at 400° C in a siliconit furnace for 2 minutes, in the same manner as in Example 1. Upon removal from the die, there was obtained a shell mold pertaining to the seventh aspect of the invention. The molding material was good in moldability. It gave off no smoke when heated for mold making. Also, it gave off a very small amount of injurious gases. It gave off only a small amount of irritating and offensive odors.

The resulting shell mold was examined for its performance by actual pouring. The amount of smoke liberated from the mold after pouring was visually observed and the degree of odor was measured organoleptically. The concentration of ammonia (NH$_3$) in the liberated gas was measured and the amount of aldehyde (HCHO) in the liberated gas was quantitatively determined.

At first, molten aluminum alloy (JIS AC2B) at 750° C. was poured into the mold. The amount of smoke liberated from the mold was visually observed and the degree of odor was examined organoleptically. The results are shown in Table 5.

TABLE 5

| Sample No. | Amount of resin-coated sepiolite (wt %) | Smoking after pouring | | | | | Degree of odor | Conc. of gas (ppm) | |
|---|---|---|---|---|---|---|---|---|---|
| | | After 0.5 min | After 1 min | After 1.5 min | After 2 min | After 3 min | | NH$_3$ | HCHO |
| 21 | 2.0 | Δ | x | x | x | Δ | Low | 800 | 0.074 |
| 22 | 5.0 | Δ | — | — | Δ | — | Low | 730 | 0.038 |
| 23 | 10.0 | Δ | — | — | — | — | Low | 670 | 0.026 |
| C3* | — | Δ | x | x | x | Δ | very high | 1270 | 0.234 |

*Comparative Example

It is noted from Table 5 that in the case of the mold of this invention, only slight smoking took place after pouring. Especially in the case where the content of sepiolite is 5.0 to 10.0 wt %, slight smoking took place for 30 seconds immediately after pouring but there was no smoking at all thereafter. In addition, the mold gave off only a small amount of irritating odor.

For the measurement of the concentration of ammonia (NH$_3$) and the determination of formaldehyde (HCHO), the sample gas was collected from a closed cylindrical container measuring 400 mm in inside diameter and 460 mm in depth provided with a gas outlet, in which the shell mold into which molten aluminum alloy (JIS AC2B) had been poured was placed. The collection of the sample gas was started 25 minutes after pouring.

The concentration of ammonia was measured using Kitagawa gas detector (made by Komei Rikagaku Kogyo Co., Ltd.). The sample gas was sucked at a rate of 100 ml per minute. The results are shown in Table 5. It is noted from Table 5 that the concentration of ammonia (NH$_3$) was low in the case of the mold pertaining to this example.

For the determination of formaldehyde (HCHO), the collected gas was passed through a solution of 2,4-dinitrophenylhydrazine in hydrochloric acid so that aldehydes forms hydrazone. The resulting hydrazone was extracted with chloroform and the extract was concentrated. The concentrated solution was analyzed by gas chromatography. The results are shown in Table 5. The conditions of analysis are shown in Table 3. It is noted from Table 5 that the mold in this example gives off only a small amount of aldehyde. In addition the shell mold in this example readily disintegrated after casting.

For comparison, a mold was produced from the above-mentioned resin-coated casting sand alone. (Sample No. C3) The mold was evaluated in the same manner as mentioned above. The results are shown in Table 5. It is noted from Table 5 that the mold for comparison gave off a large amount of smoke and irritating odor after pouring.

The molding material used for comparison gave off more smoke and irritating and offensive odors than that in the example at the time of mold making. The shell mold for comparison did not readily disintegrated after casting.

EXAMPLE 6

A molding material was prepared from resin-coated casting sand and acid-containing, resin-coated sepiolite, and the molding material was made into shell molds.

The performance of the molds was evaluated by actual pouring.

At first sepiolite from Turkey was crushed to give a sepiolite powder having an average particle diameter of 200 μm. The sepiolite powder was then impregnated with acetic acid ($CH_3COOH$) of different concentration as shown in Table 6, to give acid-containing sepiolite. The acid content is also shown in Table 6.

Commercial silica sand (No. 6, made by Mikawa Keiseki Co., Ltd.) and the acid-containing sepiolite powder were mixed in the ratio of 95 wt % to 5 wt % using a mortar mixer for 5 to 10 minutes. The resulting mixture was mixed with novolak-type phenolic resin (made by Asahi Yukizai Kogyo Co., Ltd.) in the same manner as in Example 5. Thus there was obtained the molding material for shell molds pertaining to the fourth aspect of the invention.

TABLE 6

| Sample No. | Acetic acid Conc. (N) | Acetic acid Content (wt %) | Smoking after pouring After 0.5 min | After 1 min | After 1.5 min | After 2 min | After 3 min | Degree of odor | Conc. of gas (ppm) $NH_3$ | HCHO |
|---|---|---|---|---|---|---|---|---|---|---|
| 24 | 0.1 | 20 | Δ | — | — | — | — | Low | 580 | 0.027 |
| 25 | 1.0 | 20 | Δ | — | — | — | — | Low | 520 | 0.025 |
| 26 | 5.0 | 20 | Δ | — | — | — | — | Low | 520 | 0.028 |
| 22 | — | — | Δ | — | — | Δ | — | Low | 730 | 0.038 |
| C4* | — | — | Δ | x | x | x | Δ | Very high | 1330 | 0.257 |

*Comparative Example

The molding material was placed in an iron pattern, which was then heated at 400° C in a siliconit furnace for 2 minutes, in the same manner as in Example 1. Upon removal from the pattern, there was obtained a shell mold pertaining to the fourth aspect of the invention. (Sample Nos. 24 to 26.) The molding material was good in moldability. It gave off no smoke when heated for mold making. Also. it gave off a very small amount of carbon monoxide below the detecting limit of the gas detector. It gave off a less amount of irritating and offensive odors than in the case of the third aspect.

The resulting shell mold was examined for its performance by actual pouring. The amount of smoke liberated from the mold after pouring was visually observed and the degree of odor was measured organoleptically. The concentration of ammonia ($NH_3$) in the liberated gas was measured and the amount of aldehyde (HCHO) in the liberated gas was quantitatively determined.

At first, molten aluminum alloy (JIS AC2B) at 750° C. was poured into the mold. The amount of smoke liberated from the mold was visually observed and the degree of odor was examined organoleptically. The results are shown in Table 6.

It is noted from Table 6 that in the case of the mold of this invention, only slight smoking took place for 30 seconds immediately after pouring but there was no smoking at all thereafter. In addition, the mold gave off only a small amount of irritating odor.

The concentration of ammonia ($NH_3$) and formaldehyde (HCHO) liberated after pouring were measured in the same manner as in Example 5. The results are shown in Table 6. It is noted from Table 6 that the concentration of the released gas is low. The shell mold in this example readily disintegrated after casting.

For comparison, a mold was produced from the above-mentioned resin-coated casting sand alone. (Sample No. C4) The mold was evaluated in the same manner as mentioned above. The results are shown in Table 6. It is noted from Table 6 that the mold for comparison gave off a large amount of smoke and irritating odor after pouring.

The above-mentioned results indicate that the molding material of this invention gives off only a small amount of smoke and irritating gases at the time of mold making. and the mold produced from it gives off only a small amount of smoke and irritating gases at the time of pouring, and it readily disintegrates after casting.

What is claimed is:

1. A shell mold comprising a cavity defined by a wall or walls into which molten metal is to be poured for producing a casting, wherein at least a part of said wall or walls is formed of thermosetting resin coated castings and and hydrous magnesium silicate clay mineral, and voids are formed among grains of said resin-coated casting sand and said clay mineral, with said resin-coated casting sand and said clay mineral being bonded together, thereby minimizing generation of smoke and irritating gases at the time of casting.

2. A shell mold as set forth in claim 1, wherein the hydrous magnesium silicate clay mineral is impregnated with an acid.

3. A shell mold as set forth in claim 1, wherein the hydrous magnesium silicate clay mineral is coated with a thermosetting resin.

4. A shell mold as set forth in claim 2, wherein the hydrous magnesium silicate clay mineral is further coated with a thermosetting resin.

5. A shell mold as set forth in any one of claims 1 to 1, wherein the thermosetting resin is novolak-type phenolic resin or resol-type phenolic resin.

6. A shell mold as set forth in any one of claims 1 to 4, wherein the hydrous magnesium silicate clay mineral is sepiolite, xylotile, palygorskite, or loughlinite.

7. A shell mold as set forth in any one of claims 1 to 4, wherein the hydrous magnesium silicate clay mineral has a particle size of 50 μto 1 mm.

8. A shell mold as set forth in any one of claims 1 to 4, wherein the clay mineral or resin-coated clay mineral are mixed in a ratio of 0.5 to 45 parts by weight per 100 parts by weight of the resin-coated casting sand.

9. A shell mold as set forth in one of claims 2 and 4, wherein the clay mineral is impregnated with an organic acid.

10. A shell mold as set forth in claim 9, wherein the organic acid is formic acid, acetic acid, or phthalic acid.

11. A shell mold as set forth in one of claims 2 and 4, wherein the clay mineral is impregnated with an inorganic acid.

12. A shell mold as set forth in claim 11, wherein the inorganic acid is phosphoric acid or boric acid.

13. A shell mold as set forth in one of claims 2 and 4, wherein the content of the acid in the hydrous magnesium silicate clay mineral is $10^{-3}$ wt % to 50 wt %.

14. A shell mold as set forth in one of claims 3 and 4, wherein the amount of the resin coated on the hydrous magnesium silicate clay mineral is 0.5 wt % to 20 wt %.

* * * * *